United States Patent [19] [11] 3,708,749
Bateman et al. [45] Jan. 2, 1973

[54] CURRENT TRANSFORMER

[75] Inventors: Glenn Bateman, Portland; John A. Roberts, Hillsboro, both of Oreg.

[73] Assignee: Tektronix, Inc., Beaverton, Oreg.

[22] Filed: March 18, 1971

[21] Appl. No.: 125,494

[52] U.S. Cl. .................................. 324/127, 323/48
[51] Int. Cl. .......................... G01r 1/22, G05f 7/10
[58] Field of Search .......... 324/127, 117 R; 323/6, 48

[56] References Cited

UNITED STATES PATENTS 3,384,810  5/1968  Kelsey ................................ 323/48
3,475,682  10/1969  Peek et al. ........................... 324/127
3,546,565  12/1970  Downing, Jr. et al. ................. 323/6

Primary Examiner—Rudolph V. Rolinec
Assistant Examiner—Ernest F. Karlsen
Attorney—Buckhorn, Blore, Klarquist & Sparkman

[57] ABSTRACT

A current transformer in the form of a probe includes a removable bucking winding for canceling core flux attributable to the D.C. component of current in an input conductor. The bucking winding is A.C. coupled to the transformer's output circuit and contributes a portion of the output signal.

14 Claims, 4 Drawing Figures

PATENTED JAN 2 1973

GLENN BATEMAN
JOHN A. ROBERTS
INVENTORS.

BY
BUCKHORN, BLORE, KLARQUIST & SPARKMAN
ATTORNEYS

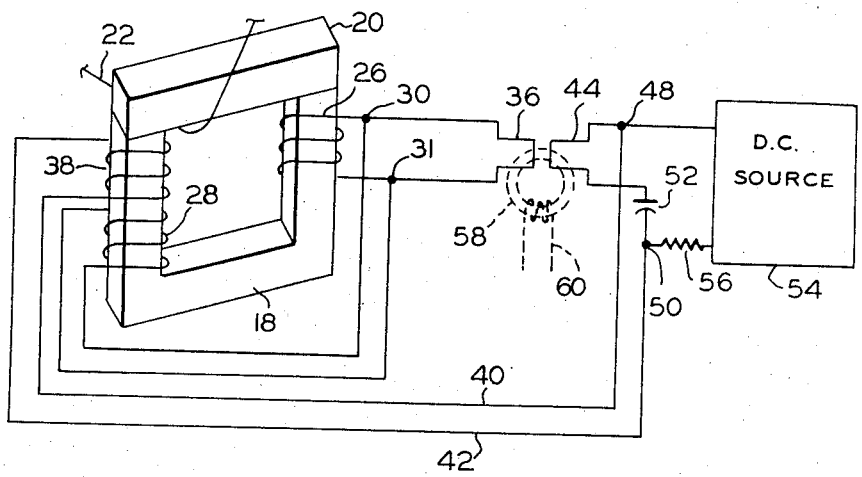
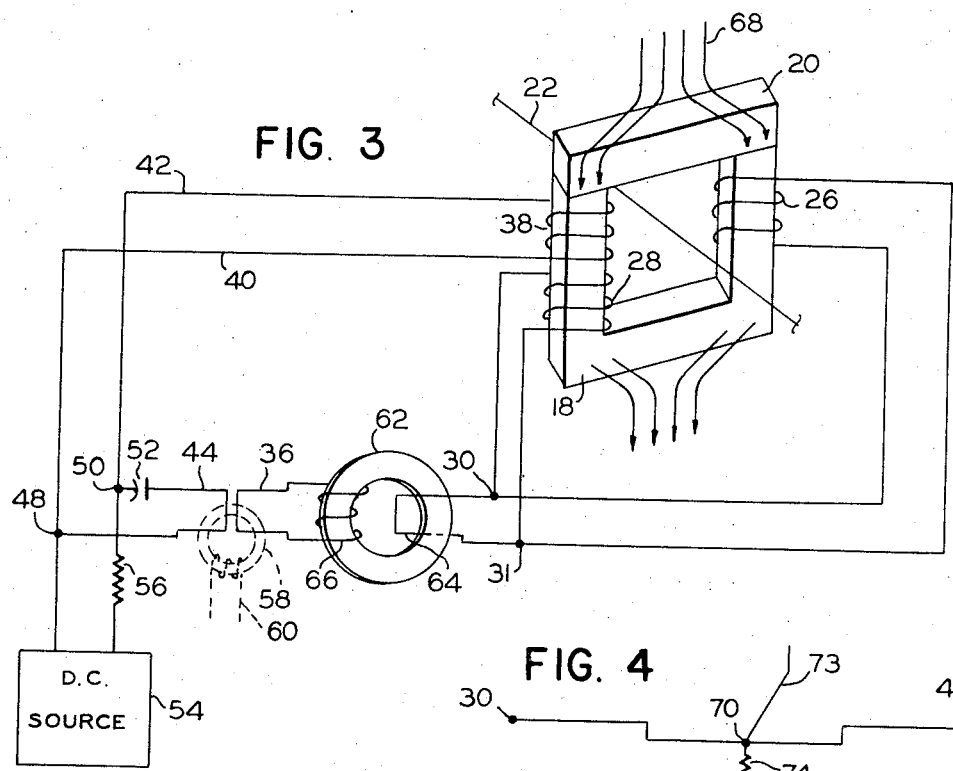
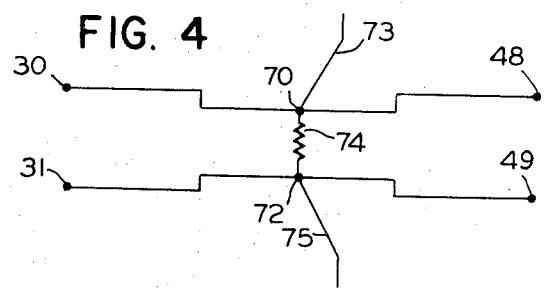

CURRENT TRANSFORMER

BACKGROUND OF THE INVENTION

Current transformers may be employed for measuring relatively large alternating currents in an input conductor, and may take the form of a probe including a closable magnetic core for selectively surrounding the conductor. The current transformer includes one or more secondary windings, the current in which is proportional to the current flowing in the input conductor.

It is frequently necessary to measure an alternating current in the presence of a direct current component also flowing in the same conductor, and which sometimes may be much larger in magnitude than the alternating current component. For this purpose, a D.C. bucking winding may be added to the current transformer and provided with a direct current for nulling the effect of the direct current in the input conductor. Without this bucking winding, the core is liable to saturation effects attributable to the direct component of current flowing in the input conductor whereby the secondary output will be incorrect in value and distorted in waveform. Distortion is particularly objectionable when observation of the alternating current waveform on an oscilloscope or the like is desired.

Mere placement of a bucking coil upon the current transformer core can, however, cause additional problems. The "ampere turns" of the primary or input conductor equal the "ampere turns" of the combined secondary windings and including the bucking winding. Therefore, the interposition of a bucking coil will change the ratio of secondary current to primary current, rendering the output inaccurate when the bucking coil is added. Furthermore, the magnetic coupling of the bucking coil, which may have a relatively large number of turns, is not necessarily the same at all times, as with insertion and removal of the winding with respect to the core, and moreover, the magnetic coupling of the bucking coil changes with frequency. Also, the loading of the bucking coil tends to change with frequency. These frequency dependent effects result in an improper transient response of the current transformer to steep waveforms and the like which include relatively high frequency alternating current components.

Another difficulty encountered with the insertion of a bucking coil is the effect it has upon stray alternating current field attenuation. Ordinarily, current transformer secondary coils are balanced in order to provide an output relatively immune to the stray fields. However, the insertion of a bucking coil can upset this balance, rendering the current transformer susceptible to stray alternating current fields, even though removing the effect of the undesired direct current components flowing in the input conductor.

SUMMARY OF THE INVENTION

According to the present invention, a current transformer for receiving a current carrying conductor, and having flux responsive secondary winding means for providing an output, is also provided with a direct current flux bucking winding adapted for carrying a direct current producing a flux in opposition to the flux in the current transformer core resulting from a direct current component flowing in the aforementioned current carrying conductor. Means are further included for coupling the bucking winding in common with the output of the secondary winding means in an additive sense. Thus, the bucking winding provides a portion of the current transformer's output signal. In this manner, the secondary output winding current is corrected and rendered accurate with changes in frequency. Compensation for whatever "subtractive" effect the bucking winding has with respect to the signal flux is achieved by proportional additional current provided from the bucking winding, restoring the output current to the correct value. Also, since the bucking winding is so connected as to provide an output compensating for whatever change may result from its insertion, the balance otherwise provided for stray alternating current field attenuation is also restored.

In accordance with a specific embodiment of the present invention, the bucking winding is suitably insertable onto a current transformer in the form of a probe, and is removable therefrom. Therefore, the bucking winding need only be employed when necessary, but does not change the alternating current output of the probe when such bucking winding is inserted. Therefore, the probe signal output remains accurate with or without the bucking winding.

It is accordingly an object of the present invention to provide an improved current transformer having means for canceling or offsetting the D.C. component of exciting flux.

It is another object of the present invention to provide an improved current transformer having D.C. flux offsetting means wherein the current transformer output is maintained accurate.

It is a further object of the present invention to provide an improved current transformer having D.C. flux opposing means wherein the "subtractive" effect of the said canceling means relative to A.C. signals is compensated for.

It is another object of the present invention to provide an improved current transformer having D.C. flux canceling means which is readily insertable and removable relative to the current transformer without interference with the accuracy of the transformer output.

It is another object of the present invention to provide an improved current transformer having D.C. flux canceling means wherein such canceling means does not interfere with stray field attenuation of the transformer.

It is an additional object of the present invention to provide a current transformer having D.C. flux canceling means wherein such transformer produces an accurate output representation with variations in frequency and has a good transient response.

The subject matter which we regard as our invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 2 is a schematic diagram illustrating wiring of the FIG. 1 probe, according to a first embodiment of the present invention;

FIG. 3 is a schematic diagram illustrating wiring of the FIG. 1 probe, according to a second embodiment of the present invention; and FIG. 4 is a schematic diagram illustrating an alternative output summing means according to the present invention.

DETAILED DESCRIPTION

Figure 1:
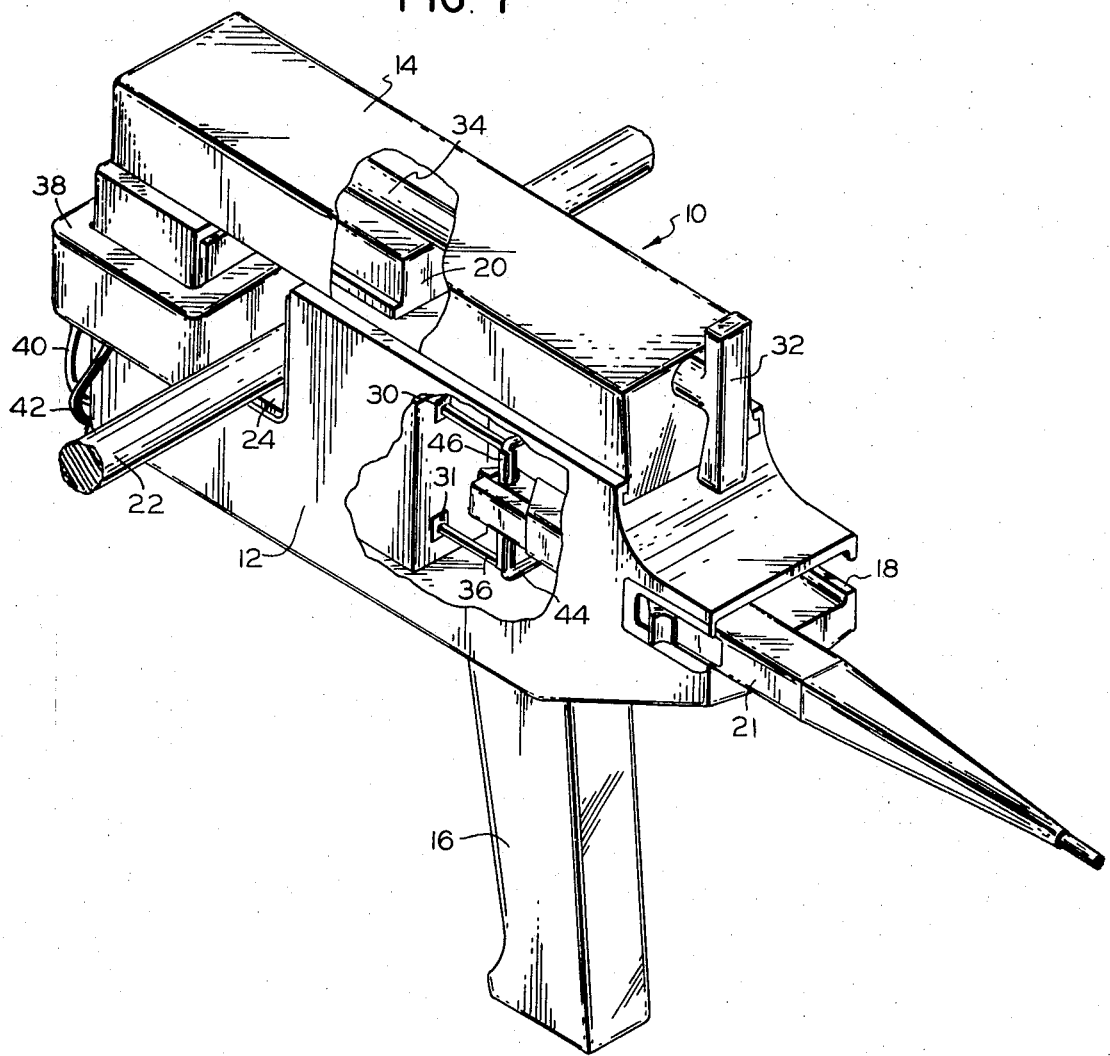
FIG. 1 is a perspective view of a current transformer according to the present invention in the form of a probe.

Referring to the drawings and particularly to FIG. 1, a current transformer according to the present invention is illustrated in the form of a probe 10 having a fixed portion 12 and a movable portion 14. The fixed portion is provided with a hand grip 16 and a rear entry slot 18 through which a smaller probe 21 may be inserted. Both the fixed and movable portions of the probe are provided with magnetic core portions respectively, with the movable core portion appearing at 20. In the position shown for the movable core portion, the same is located in juxtaposition with a fixed core portion thereunder for completing a magnetic circuit linked by a conductor 22 carrying a current to be measured. The fixed portion of the probe is provided with a channel 24, suitably of insulating material, adapted to receive conductor 22 and separating the same from the magnetic core.

The relation is more clearly illustrated in FIG. 2 between the conductor 22 and movable core portion 20 juxtaposed with respect to fixed core portion 18. Conductor 22 passes through the enclosed aperture. The fixed core portion is provided with secondary windings 26 and 28 wound on either side of the core portion 18 and which are connected in parallel to provide a common current output at terminals 30 and 31. As hereinafter more fully described, the currents produced in windings 26 and 28 add when such current is responsive to flux in the combined core induced by current in conductor 22. However, for stray fields, the currents from windings 26 and 28 tend to cancel.

Returning to FIG. 1, the movable portion 14 of the probe is slidable rearwardly, i.e., to the right in FIG. 1, when the same in unlocked by means of handle 32 which is rotatable for turning shaft 34. In the position shown, the shaft, which carries a locking member, holds movable core portion 20 in locked juxtaposed relation with the fixed core portion. However, if handle 32 is turned by ninety degrees, the movable portion 14 may be slid to the right for opening channel 24 whereby conductor 22 is readily inserted or removed.

A loop 36 is connected between terminals 30 and 31 and is engageable by smaller probe 21 adapted for measuring current flowing in loop 36. Smaller probe 21 is in some respects similar in construction to the overall probe illustrated in FIG. 1, but is adapted for receiving a smaller conductor carrying a smaller current. A probe of this type is described more fully in U.S. Pat. No. 3,475,682, granted Oct. 28, 1969, to William H. Peek and Glenn Bateman, entitled "Shielded Current Measuring Device", and assigned to the assignee of the present invention. The probe 21 is adapted for providing an input to an oscilloscope or other measuring instrument.

The FIG. 1 device is further provided with a removable offset winding or bucking coil 38 adapted for generating a flux in the combined core 18, 20 which is equal to and opposite to the flux generated by a D.C. component of current in conductor 22. Coil 38 carries a D.C. bucking current supplied by means not shown in FIG. 1. This bucking coil has a pair of terminal leads 40 and 42 additionally coupled to a loop 44 which may be arranged in linking input relation to the smaller probe 21. Thus, as illustrated in FIG. 1, the loop 44 is suitably received in an open metal channel 46 secured lengthways as by soldering to the rearward edge of loop 36. Loop 44 is suitably formed from an insulation covered conductor so that it may be placed within channel 46, and therefore in linking relation to probe 21, also linked by loop 36, without making actual electrical contact with loop 36. As hereinafter more fully described, the bucking coil 38 is thereby adapted to provide a portion of the probe signal, when the bucking coil is at the same time principally employed to buck a large D.C. component of current in conductor 32. Alternatively, bucking coil 38 may be removed, and loop 44 may be removed from channel 46, when the same is not in use.

Turning again to FIG. 2, the leads 40 and 42 of winding 38 are coupled to loop 44 by means of a capacitor 52 disposed between lead 42 and the loop. Thus, leads 40 and 42 suitably connect respectively to terminals 48 and 50. Terminal 48 is connected directly to one side of loop 44, while the remaining side of the loop is coupled to terminal 50 by way of capacitor 52. A D.C. source 54 has a first output terminal connected to the terminal 48, and a second output terminal coupled to the aforementioned terminal 50 by way of resistor 56.

The smaller probe 21 is provided with a magnetic core represented by dotted lines at 58 in FIG. 2. It is this core which is linked by both loops 36 and 44, when bucking coil 38 is in use, the combined field of which produces a flux in core 58 causing a current in output winding 60 also disposed on core 58. The current in winding 60, as well as the output of other flux sensitive means which may be employed, comprises the output of probe 21 and is suitably coupled to provide vertical deflection on an oscilloscope or the like. Therefore, the waveform of alternating current flowing in conductor 22 can suitably be represented and measured.

Considering operation of the above-described apparatus, with particular reference to the FIG. 2 circuit, D.C. source 54 is adapted to provide a current to bucking winding 38 for canceling or nulling the effect of D.C. current flowing in input conductor 22. Frequently the magnitude of the D.C. component of current flowing in conductor 22 is known. In the FIG. 2 embodiment, windings 26, 28, and 38 have the same number of turns, and consequently the D.C. current provided from source 54 will approximately equal the current in conductor 22 divided by the number of turns in a winding. If the D.C. component of current in conductor 22 is unknown, and if probe 21 including core 58 is connected to an oscilloscope, the proper bucking current from D.C. source 54 is easily determined. The oscilloscope waveform is viewed while varying the current from source 54 until the current or range of current is achieved wherein the A.C. waveform viewed is maximized. At this point, saturation of core 18 is no longer taking place and the output waveform will be undistorted.

According to the present invention, objectionable effects introduced by the interposition of bucking coil 38 are substantially eliminated. Considering first the problem involved, it will be realized the sum of the output ampere-turns on core 18, 20 equals the input ampere-turns. Assuming the input conductor 22 constitutes a single turn, then $I_p = N_{26}I_{26} + N_{28}I_{28} + N_{38}I_{38}$, wherein $I_p$ equals the primary current or the current in conductor 22, wherein N with the appropriate subscript equals the number of turns in the respective numbered winding, and wherein I with the appropriate subscript equals the current in such winding. If only windings 26 and 28 were present, $I_p + N_{26}I_{26} + N_{28}I_{28}$. Since N for each of the windings is the same, $I_p$ $NI_T$ wherein $I_T$ equals the total of currents in the windings present. It is seen that the output current, if derived only from windings 26 and 28 in the conventional manner, would be reduced if winding 38 were also present. That is, the ratio of the secondary currents in windings 26 and 28 to the primary current will not remain the same with and without the bucking or offset coil, since the offset coil in effect subtracts current which might otherwise flow in the secondary windings 26 and 28. Thus, amplitude inaccuracies in the output would be caused by the insertion of the bucking coil. Moreover, the coupling of the bucking coil to the magnetic circuit comprising core portions 18 and 20 is not always the same, and changes with frequency. As a result, the subtractive effect of the bucking coil does not remain constant with frequency. The core 18, 20, for instance, tends to lose its flux confining effect at higher frequencies relative to the bucking coil, for example due to the physical proportions and placement of the bucking coil. Likewise, the loading of the bucking coil tends to change with frequency. As a result of these factors, the probe, with the bucking coil added, may have poor transient response and may be poorly able to couple rapidly changing waveforms and the like to loop 36 for accurate presentation.

According to the present invention, these problems are solved by A.C. coupling the bucking winding to output measuring means together with the conventionally provided secondary currents. Thus, winding 38 is not only coupled to the D.C. source, but is also coupled via the loop 44 along with the other winding currents to the combined flux measuring device for providing a combined output. Then, the varying subtractive effect, which the bucking winding would otherwise have, is effectively eliminated. Whatever A.C. current is carried by the bucking winding is added to the combined output. If the current taken by the bucking winding decreases with frequency, the current in secondary coils, 26, 28, tends to vary in the opposite manner so as to provide an output continuously and accurately indicative of the input.

In the FIG. 2 circuit, the resistance of resistor 56 is made large compared to the capacitive reactance of capacitor 52 at the lowest frequency of interest in the A.C. measurement. Therefore, the A.C. signal derived from bucking coil 38 will nearly all flow in loop 44 rather than being bypassed to D.C. source 54. Also, of course, the capacitor 52 prevents loop 44 from shunting the D.C. source 54. If the D.C. source 54 is placed remotely from the probe and is connected by means of a cable, the capacitor 52 is disposed at the probe end of the cable for achieving better high frequency response.

Another embodiment of the present invention is illustrated in FIG. 3. This embodiment is substantially similar to the one previously described, with the exception that an additional transformer comprising a toroidal core 62 is inserted between terminals 30, 31, and loop 36. The toroidal core is suitably formed of ferrite and has an outside diameter of about 1.5 inches. It has wound thereupon a primary winding 64 and a secondary winding 66, wherein the ratio of secondary turns to primary turns is suitably 50 to 1. In the FIG. 3 embodiment, bucking coil 38 is provided with a much larger number of turns than secondary windings 26 and 28. Therefore, bucking coil 38, connected to terminals 48 and 50, will be more effective in producing a large D.C. bucking flux. It is desired that the number of turns on secondary windings 26 and 28 remain smaller to provide a good transient response with less winding capacitance and the like. At the same time, the toroidal core transformer between terminals 30, 31 and loop 36, can couple the output from terminals 30, 31 to loop 36 with good transient response.

The A.C. current flowing in loop 36 is reduced in FIG. 3 by the turns ratio of the transformer comprising toroidal core 62, as compared with the current flowing in windings 26 and 28. The A.C. current flowing in winding 38 and coupled by capacitor 52 to loop 44 will also be commensurately smaller, and the probe 21 including core 58 operates at a smaller current level.

In a typical =windings 26 and 28 were each composed of twenty turns, resulting in favorable transient response. However, winding 38 consisted of a thousand turns whereby the D.C. component of current in conductor 22 was easily nulled with a relatively smaller current from source 54. In the FIG. 3 embodiment, $N_{26}N_{66} - N_{28}N_{66} = N_{38}$, wherein N equals the number of turns in the winding corresponding to the subscript, assuming winding 64 has one turn. In a given instance the probe as illustrated in FIG. 1 suitably employs the actual wiring as illustrated in FIG. 3 rather than that illustrated in FIG. 2. The bucking coil 38 in FIG. 1 then includes the larger number of turns for bucking a large D.C. component of current in conductor 22.

An additional advantage of the apparatus according to the present invention will be described in connection with the FIG. 3 representation. A probe, such as herein described, is frequently subjected to stray A.C. fields in the vicinity of large electrical equipment and the like. Such a field is illustrated by flux lines 68 in FIG. 3. Assuming substantially equal reluctance of the legs on either side of the probe core, then the stray field tends to divide equally as shown. Since secondary windings 26 and 28 are disposed one on each leg, the outputs thereof will be seen to be subtractive at terminals 30 and 31 relative to voltages induced by the stray field flux, while the output of the two windings is additive for a field produced in the core as a result of current flow in conductor 22. However, with the addition of winding 38, the situation can become unbalanced. Assuming for the moment that the A.C. output from winding 38 is not added to the outputs of windings 26 and 28, it will be seen some difficulty can arise. Currents due to the stray field in windings 26 and 28 will be different. Thus, a voltage induced in winding 26 will produce a current in such winding resulting in a counter flux substantially equal to the stray field flux in the right hand leg. However, voltages will be induced in windings 38 and 28 causing currents to flow in such windings producing flux components the total of which will substantially equal the stray field flux in the left-hand leg. Therefore, the current in winding 28 will be, in effect, reduced by the current flowing in winding 38 (multiplied by the turns ratio between the two). However, according to the present invention, the current in winding 38 resulting from the stray field flux, is coupled to loop 44 where cancellation is completed in conjunction with flux provided by loop 36. Therefore, the bucking winding may be easily positioned on the forward leg of the probe, as illustrated in FIG. 1, without concern relative to unbalance in stray field compensation.

While a flux coupled measuring device in the form of a second or smaller probe 21 is herein described for adding the A.C. currents from the conventional secondary winding and current from the bucking coil, it is understood that other means may be employed for simultaneously summing and measuring these currents. For instance, a summing amplifier may be used for this purpose.

A simple summing means is illustrated in FIG. 4 comprising a small value resistor 74 disposed between common terminals 70 and 72. Terminal 70 is coupled to the hereinbefore mentioned secondary winding terminal 30, while terminal 72 is similarly coupled to secondary winding terminal 31. It will be understood that the toroidal core transformer of FIG. 3 may be employed between terminals 30, 31, and 70, 72 in the case of the FIG. 3 embodiment. Terminal 70 is further connected to terminal 48 at the end of lead 40 from bucking coil 38, while terminal 72 is connected to a terminal 49, comprising the opposite terminal of capacitor 52 from the one connected to terminal 50. It will be seen that A.C. currents flowing from the respective windings will flow in the same direction or add in resistor 74 producing a total voltage drop indicative of their sum. Leads 73 and 75, from terminals 70 and 72 respectively, may be connected to a measuring instrument, oscilloscope, or the like responsive to the output signal. The resistance of resistor 74 should be quite small, e.g., it should be small in comparison to the resistance of resistor 56. Also, $2\pi L/R$ should be below the lowest frequency of interest. Assuming the FIG. 3 embodiment is employed, L is the inductance of coil 38 in henries, and R is the resistance of resistor 74 in ohms.

While we have shown and described preferred embodiments of our invention, it will be apparent to those skilled in the art that many changes and modifications may be made without departing from our invention in its broader aspects. We therefore intend the appended claims to cover all such changes and modifications as fall within the true spirit and scope of our invention.

We claim:

1. In a current transformer having a core adapted to receive a current carrying conductor in linking relation therewith, and having flux responsive output winding means on said core for providing an alternating current output indicative of the current in said conductor,
   a direct current flux bucking winding for said transformer,
   a direct current source coupled only to said bucking winding to provide a flux in opposition to flux produced in said core by direct current flowing in said conductor,
   and coupling means separate from said current transformer for combining the alternating current output produced in said bucking winding with the alternating current output produced in said output winding means.

2. The apparatus according to claim 1 wherein said means for coupling includes a capacitor interposed between said bucking winding and said output winding means and direct coupling means for connecting said bucking winding to said source of direct current.

3. The apparatus according to claim 2 wherein said direct coupling means includes a resistor.

4. The apparatus according to claim 1 wherein said means for coupling includes common flux responsive means linked by winding loops respectively coupled to said output winding means and said bucking winding.

5. The apparatus according to claim 1 wherein said means for coupling includes means for summing the currents from said output winding means and said bucking winding.

6. The apparatus according to claim 1 wherein said means for coupling includes a common impedance means for receiving current from said output winding means and said bucking winding.

7. The apparatus according to claim 1 further including a transformer between said output winding means and said coupling means, said transformer having a turns ratio for providing a reduced current at said means for coupling, said bucking winding bearing the same turns ratio with respect to said output winding means.

8. A current probe comprising:
   a fixed portion and a movable portion, said fixed portion carrying a fixed core portion and said movable portion carrying a movable core portion adapted for juxtaposition with the fixed core portion to form a magnetic circuit around an input conductor adapted to be received in an aperture then formed between said fixed and movable core portions,
   said fixed core portion having flux responsive output winding means on said core for providing an output indicative of current in said input conductor,
   a direct current flux bucking winding receivable in linking relation with said fixed core portion, with said winding passing through the aperture between said core portions,
   direct current means for supplying a direct current only to said bucking winding for providing a flux in opposition to flux produced in said core by a direct current flowing in said input conductor,
   and coupling means separate from said magnetic circuit for coupling said bucking winding with said output winding means and providing a combined alternating current output from said output winding means and said bucking winding.

9. The probe according to claim 8 wherein said bucking winding is removably receivable upon said fixed portion of said probe in linking relation with said fixed core portion.

10. The probe according to claim 9 wherein said coupling means is selectively removable from such coupling relation.

11. A current probe comprising:
a fixed portion and a movable portion, said fixed portion carrying a fixed core portion and said movable portion carrying a movable core portion adapted for juxtaposition with the fixed core portion to form a magnetic circuit around an input conductor adapted to be received in an aperture then formed between said fixed and movable core portions,
said fixed core portion having flux responsive output winding means cooperating therewith for providing an output indicative of current in said input conductor,
a direct current flux bucking winding receivable in linking relation with said fixed core portion, with said winding passing through the aperture between said core portions,
direct current coupling means for supplying a direct current to said bucking winding for providing a flux in opposition to predetermined flux as would be caused to exist in said core by a predetermined direct current flowing in said input conductor,
and means for coupling said bucking winding in common with said output winding means to provide a combined alternating current output from said output winding means and said bucking winding,
said means for coupling comprising loops connected respectively to said bucking winding and said output winding means, and a common flux coupled measuring device linked by both said loops.

12. The probe according to claim 11 further including transformer means between said output winding means and the loop connected thereto, such transformer having a turns ratio wherein the larger number of turns is connected to said loop, the bucking winding having a turns ratio with respect to each output winding means which is equal to the turns ratio of said transformer.

13. The probe according to claim 12 wherein said output winding means comprises a pair of output windings each having an equal number of turns and located respectively on parallel legs of said fixed core portion.

14. The transformer of claim 1 wherein said output winding means includes a plurality of separate windings connected in parallel and said bucking winding is removable from said core.

* * * * *